United States Patent Office 2,904,825
Patented Sept. 22, 1959

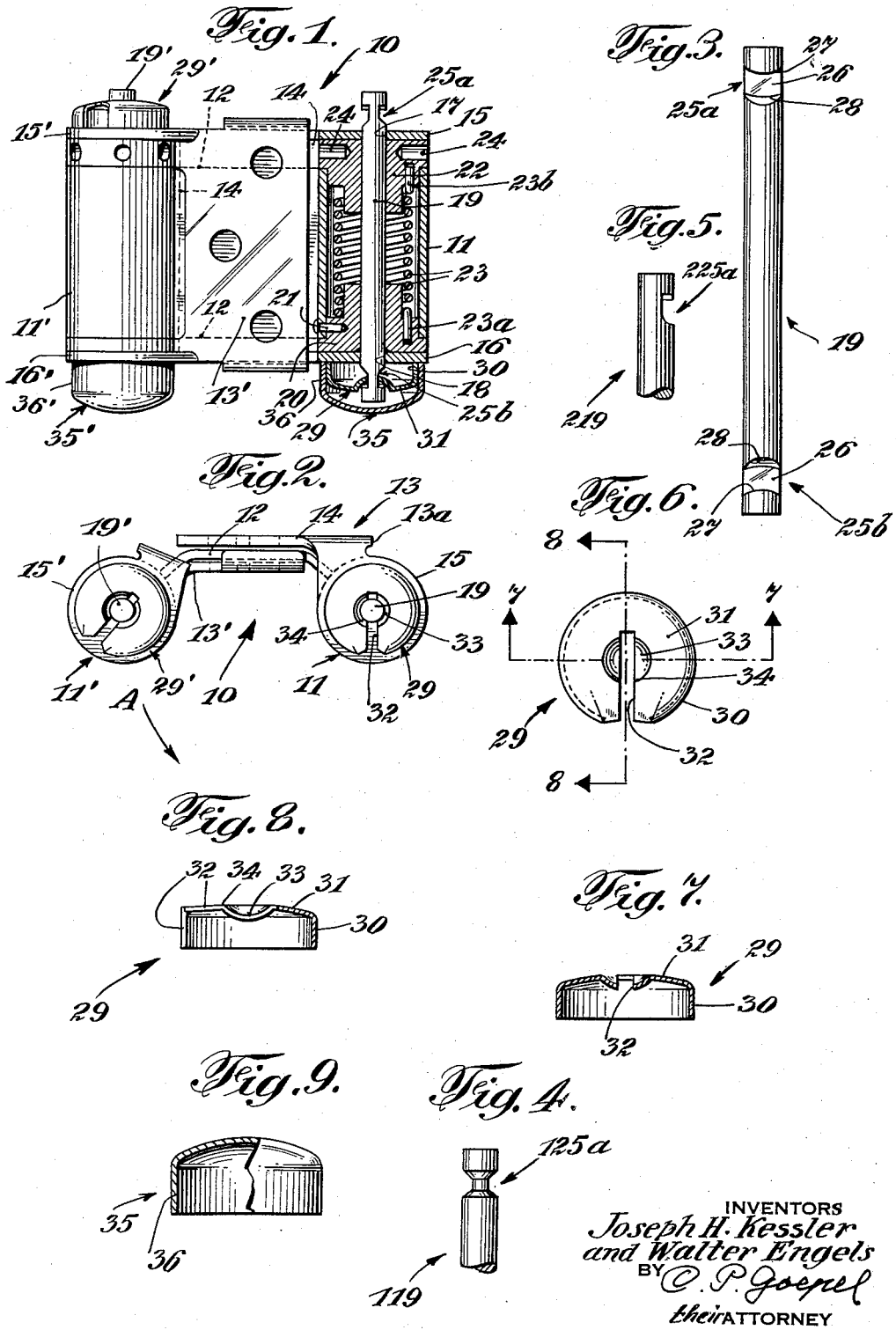

2,904,825
MECHANICAL CONNECTIONS

Joseph H. Kessler, Landrum, S.C., and Walter Engels, Tryon, N.C., assignors to Bommer Spring Hinge Co. Inc., Landrum, S.C., a corporation of New York Application November 1, 1957, Serial No. 693,851

11 Claims. (Cl. 16—169)

Our present invention relates to mechanical connections in general, and more particularly to improved means for holding two or more relatively rotatable elements against axial displacement with respect to each other. The novel connection is particularly suitable for use in spring hinges, i.e. for removably connecting a flange with the barrel of a spring hinge in such manner that the flange may rotate relative to the barrel in unison with or without the parts which constitute our mechanical connection, but cannot affect the locking action of the connection.

An important object of the invention is to provide a simple but reliable mechanical connection whose parts may be mass-produced of readily available materials and may be assembled by machines instead of by hand.

Another and more specific object of the invention is to provide a mechanical connection for rotatably holding a flange with respect to the barrel of a spring hinge which may be readily taken apart but whose locking action is not affected by the movements of the flange.

An additional object of the invention is to provide a mechanical connection for operatively connecting certain component parts of a single or double acting spring hinge, which is of light weight, and, when assembled with the hinge, enhances the appearance of the latter and prevents entry of foreign matter therein.

In single or double acting spring hinges of known construction, the bent-over lips of each flange are rotatably held in a position adjacent to the exposed faces of tension collars by means of a threaded pintle which axially traverses the spring-loaded barrel of the hinge. A pair of button tips which are screwed onto the respective ends of the pintle maintain the latter in desired position. In order to prevent unscrewing of the button tips when the flange is rotated, the pintle and the two lips of the flange must be interlocked so that the flange, the pintle and the button tips all rotate in unison when the spring hinge is put to use. The interlocking of lips with the pintle requires precision in manufacture and manual assembly which considerably increases the cost of the hinge. Moreover, known button tips are made of solid rods in screw machines and, four being necessary for each double acting spring hinge, add considerably to the overall weight of the assembled article.

In accordance with a feature of our invention, an elongated, non-threaded pintle is so locked with respect to the lips of a flange that the button tips, indirectly carried by the pintle, cannot become loose regardless of whether or not the pintle rotates with the flange. This is accomplished by the provision of a specially formed cup-shaped locking washer with a radial slot for the reception of a reduced portion of the pintle, the washer bearing against the adjacent lips of a flange to preferably follow all angular movements of the flange but is prevented from being separated from the pintle by a cup-shaped cover member or button tip which is frictionally held thereon in such manner as to close the open end of the slot in which the reduced portion of the pintle is received. To separate the locking washer from the pintle, the button tip must be removed first and the washer thereupon slid off the pintle by moving it in a direction substantially at right angles to the pintle axis, a movement which is positively prevented when the button tip is placed over the cupped washer.

The locking washer and the button tip may be manufactured of sheet metal and since no thread cutting machinery is necessary, the novel mechanical connections may be mass-produced at a very low cost.

Other features, advantages and attributes of our connection will become apparent in the course of the following detailed description of certain preferred embodiments which are illustrated in the accompanying drawing, and the invention will be finally pointed out in the appended claims.

In the drawing,

Fig. 1 is front elevational view of a double acting spring hinge embodying the novel mechanical connection with one barrel of the hinge shown in axial section;

Fig. 2 is a top plan view of the hinge;

Fig. 3 is an enlarged view of the pintle;

Figs. 4 and 5 illustrate two modifications of the pintle;

Fig. 6 is an enlarged top plan view of the locking washer;

Figs. 7 and 8 are transverse sections taken, respectively, on lines 7—7 and 8—8 of Fig. 6; and Fig. 9 is an enlarged view of the button tip or cover in partial section.

Referring now in greater detail to the drawing, and first to Figs. 1 and 2, the double acting spring hinge 10 comprises a pair of barrels 11, 11' which are connected by and here shown integral with a plate 12. Circular lips 15, 16 which are integral with and at right angles to the main body portion 14 of flange 13 are provided with respective central bores 17, 18 for the passage of a pintle 19 which is coaxially received in the barrel 11. Flange 13 may be fastened to a door jamb and another flange 13', rotatable about pintle 19' in barrel 11', may be fixed to a door as is well known and customary in the art.

Barrel 11 contains a stationary tension collar 20 which is fixed thereto by a pin 21, a rotatable tension collar 22, and a coil spring 23 whose ends 23a, 23b are received in the bores provided in respective collars 20, 22. A tension pin (not shown) may be inserted into one of radial apertures 24 in the tension collar 22, whereby the shoulder 13a of flange 13 bears against the tension pin when the barrel 11' with connecting plate 12 rotates about the pintle 19 in barrel 11 in the direction of arrow A (see Fig. 2). Lip 15 of the flange 13 rotates with tension collar 22 when a tension pin is inserted into one of apertures 24, whereas the lower lip 16 rotates relative to the permanently anchored tension collar 20. The action of flange 13' whose lips 15', 16' are rotatably held by pintle 19' passing through the barrel 11' is analogous. All the above described parts as well as the manner in which they operate, save for the specific configuration of pintles 19, 19', are well known in the art and form no part of our invention.

Pintle 19 has a pair of reduced neck zones 25a, 25b adjacent to its (in Figs. 1 and 3) upper and lower end, respectively. Each neck zone is defined by a pair of lateral cutouts each of which is bounded by a flat surface 26 parallel with the pintle axis, a convex surface 27 adjacent to the nearest extremity of the pintle, and an inclined surface 28 facing the convex surface 27.

Locking washer 29, shown in greater detail in Figs. 6 to 8, has an annular flange 30, a base 31, and a radial slot 32 whose width equals the distance between adjacent surfaces 26 of neck zone 25a or 25b. The center of slotted base 31 is concave, as at 33, and of a curvature complementary to that of surfaces 27 on neck zones 25a, 25b of the pintle, these surfaces being received in the recess 33 when the locking washer 29 and pintle 19 are assembled (see pintles 19, 19' and washers 29, 29' in Fig. 2). When a washer 29 is so located on the pintle, cup-shaped cover or button tip 35 is forced over the locking washer in such manner that the annular flange 36 of the button tip slides over and frictionally engages the washer flange 31. It will be seen that the assembly of pintle 19, washer 29, and button tip 35 is thus securely locked and cannot be separated regardless of whether or not pintle 19 rotates with lips 15, 16 of the flange 13. If the hinge 10 is to be taken apart, cupped button tips 35 must be taken off the locking washers 29 and the washers thereupon removed from pintle 19 by moving them in a direction radially to the pintle axis, i.e. in such direction that the neck zones 25a, 25b of the pintle are slid out of the cutouts 32 in the washers. The operator must overcome the resistance of the somewhat resilient material of the washer when the convex surfaces 27 move from their recess 33 over the adjacent ridge 34 on the upper face of the washer.

In Fig. 1, the lower ends of pintles 19, 19' are fully assembled with the locking washers (washer 29 shown) and button tips 35, 35'. The upper end of pintle 19' carries a washer 29', and the upper end of pintle 19 is free. It will be noted in this figure that the length of flanges 30 and 36 of respective members 29 and 35 is so selected that their ends bear against the exposed face of adjacent flange lip 15 or 16 when the mechanical connection consisting of members 19, 29 and 35 is assembled with the barrel 11 of the spring hinge. In this manner, the surfaces 27 in the neck zones of each pintle are in firm contact with the concave surface of a recess in the locking washer to prevent radial movements of the washer relative to the pintle, while the end surfaces of flanges 30 and 36 of respective members 29, 35, being in continuous contact with the adjacent lips 15, 16 of flange 13, seal the hinge against the entry of foreign matter into the interior of the locking washer.

In Fig. 4, the neck zone of pintle 119 is cylindrical and the locking washer is thus free to rotate relative to the pintle in contrast to the assembly shown in Figs. 1 and 2 where the flat surfaces 26 in the neck zones 25a, 25b of pintle 19 prevent rotation of washer 29 when the pintle and the washer are assembled.

In Fig. 5, the pintle 219 has a neck zone 225a defined by a single cutout. This form of cutout also prevents rotation of the locking washer.

The invention is, of course, not limited to the exact details of construction hereinabove described but may be embodied in a number of further modifications within the spirit and scope of the appended claims. For example, washer 29 at the lower end of pintle 19 shown in Fig. 1 may be omitted and that end of the pintle rigidly connected with the button tip 35. Furthermore, flanges 30 and 36 of washer 29 and button tip 35, respectively, need not be circular but may be polygonal, for example, of square or hexagonal contour. It will also be understood that the mechanical connection consisting of members 19, 29 and 35 is useful in many other structures other than spring hinges wherever two or more relatively rotatable elements should be releasably locked against axial displacement with respect to each other.

What we claim and desire to protect by Letters Patent is:

1. A mechanical connection comprising, in combination, an elongated member having a reduced neck zone adjacent to one of its extremities; a cupped locking member having a radial slot formed with an open end and of a width sufficient to receive only said neck zone; and a sealing member telescoped over said locking member in such manner as to close the open end of said slot in said locking member and to thereby prevent withdrawal of the neck zone from said slot.

2. A mechanical connection comprising, in combination, a cylindrical pintle having a reduced neck zone adjacent to one of its extremities; a cupped locking washer having a base, a tubular flange, and a radial slot in said flange extending into said base, the width of said slot being sufficient to receive said neck zone of said pintle; and a cupped cover having a base and a tubular flange adapted to be telescoped over said locking washer in such manner that said flange of said locking washer is frictionally received in said flange of said cover and said extremity of said pintle is between said bases of said locking washer and said cover, respectively.

3. The combination according to claim 2, wherein said neck zone of said pintle has a pair of surfaces parallel with the axis of said pintle and the distance between said surfaces is substantially equal to the width of said slot in said locking washer, whereby said pintle is prevented from rotation with respect to said locking washer when said neck zone thereof is received in said slot.

4. The combination according to claim 2, wherein said neck zone is cylindrical.

5. The combination according to claim 2, wherein said flanges of said locking washer and of said cover are cylindrical.

6. The combination according to claim 2, wherein said neck zone has at least one convex surface and said base of said locking washer has a concave recess of a curvature complementary to that of said convex surface, said convex surface being received in said recess when said neck zone of said pintle is received in said slot in said locking washer.

7. In a spring hinge having at least one tubular barrel, a pair of tension collars fitted into the respective open ends of said barrel, a coil spring in said barrel having its extremities anchored in the respective ones of said tension collars, and a flange having a pair of lips each adjacent to the exposed surface of one of said tension collars, said lips and said tension collars each having an aligned circular bore, the combination of a pintle having a cylindrical body received in said barrel and passing through said aligned bores and projecting beyond said lips of said flange, a reduced neck zone between each extremity of said pintle and the adjacent one of said lips, a pair of cup-shaped locking washers each having a base, a tubular flange and a slot extending through said flange and into said base, the width of said slots being such as to receive therein said neck zones of said pintle, and a pair of substantially cup-shaped covers each having a base and a tubular flange and each telescoped over one of said locking washers in such manner that the flanges of said covers frictionally engage said flanges of said locking washers and that the extremties of said pintle are received between said bases of said covers and said locking washers, respectively, the length of said flanges of said locking washers being such that said flanges each engage the adjacent one of said lips when said neck zones of said pintle are received in said slots in said locking washers.

8. The combination according to claim 7, wherein said barrel and said flanges of said covers are cylindrical and the outer diameters of said flanges are substantially equal to the outer diameter of said barrel.

9. The combination according to claim 7, wherein said neck zones of said pintle each have at least one flat surface in contact with the respective one of said locking washers, whereby said pintle is prevented from rotation with respect to said locking washers.

10. The combination according to claim 7, wherein the base of each of said locking washers has a recess and at least one surface of each of said neck zones is so shaped as to be received in said recess.

11. The combination according to claim 7, wherein said neck zones of said pintle are cylindrical.

References Cited in the file of this patent

UNITED STATES PATENTS

| | | |
|---|---|---|
| 636,332 | Glover | Nov. 7, 1899 |
| 787,514 | Hubbard | Apr. 18, 1905 |
| 1,013,948 | Northall | Jan. 9, 1912 |
| 1,403,813 | Pinto | Jan. 17, 1922 |
| 2,615,759 | Becker | Oct. 28, 1952 |